Figure 3:
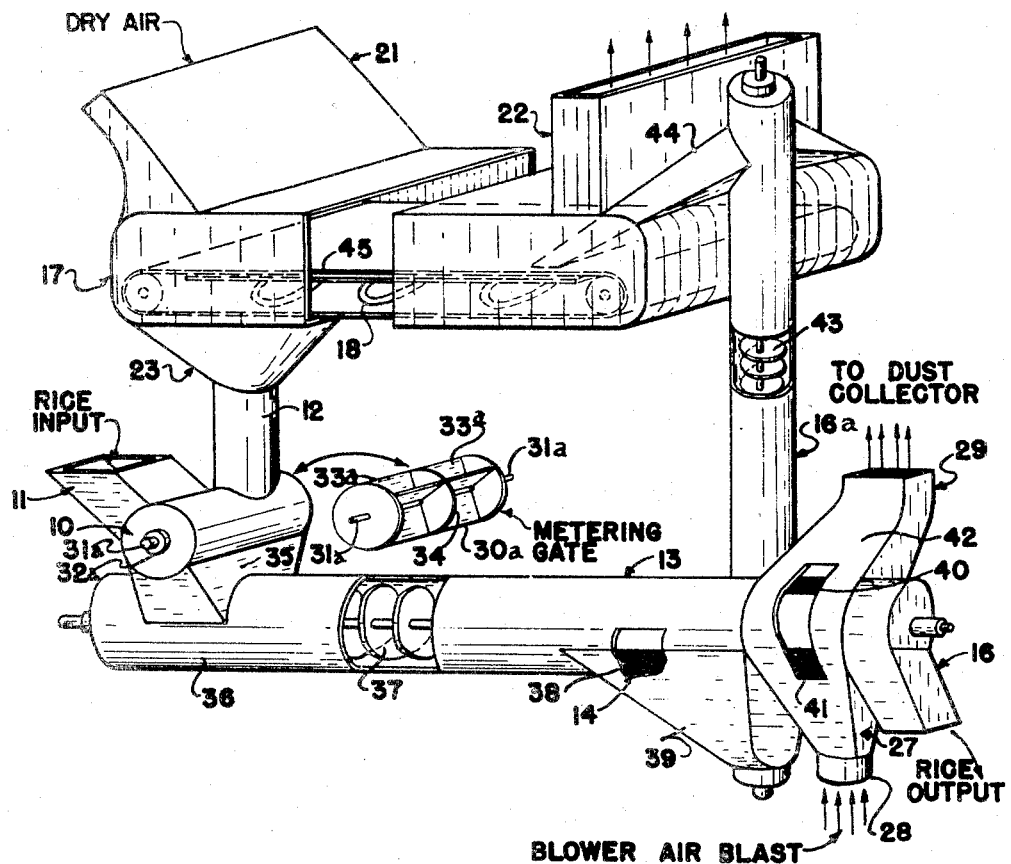

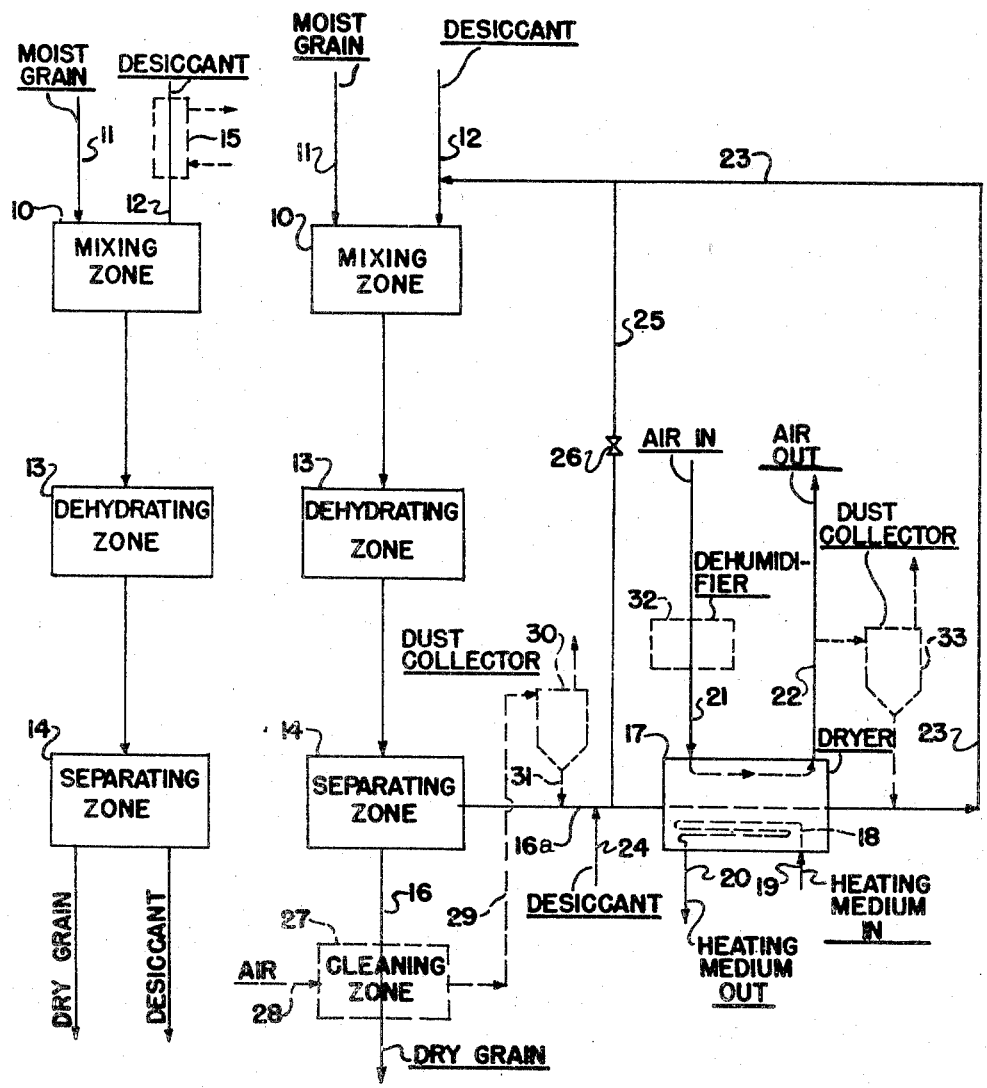

Patented July 24, 1951

2,561,442

UNITED STATES PATENT OFFICE 2,561,442

METHOD FOR DEHYDRATING GRAIN

Leonidas N. Lyon, Jr., and Benjamin F. Arnim, Houston, Tex.

Application March 19, 1948, Serial No. 15,914

2 Claims. (Cl. 34—9)

This invention relates to the drying of grain and particularly to the drying of rice.

To avoid the losses which occur when grain, such as rice particularly, is allowed to remain in the field until it has become sufficiently dry for storage and other processing purposes, present practice has been to harvest the rice at a stage when it is ripe but before it has become thoroughly field dried. It is harvested at a stage when the rice, including the husks, contains approximately 20% of moisture. This type of rice, which is commonly referred to as "paddy" rice, must then be sent promptly to more or less conventional forms of driers where the moisture content is reduced to some lower value, generally about 14%, in which condition the rice may be stored without serious danger of fermentation or moulding and will be sufficiently dry for handling in the subsequent conventional milling operations of removing the husks and bran, polishing, and packaging.

The method most commonly used at the present time for drying "paddy" rice is to flow the freshly harvested rice into counter-current contact with a stream of heated air which acts to absorb from the rice the requisite amount of moisture. Ordinarily in such conventional drying processes, atmospheric air of normally uncontrolled humidity is employed. The air is commonly heated by passing it through a combustion chamber in which an open flame, burning some suitable fuel, such as natural gas, is maintained. The air, mixed with the products of combustion of the gas or other fuel and heated thereby, is then directed into intimate counter-current contact with a downwardly flowing stream of the rice for effecting the removal of the excess moisture from the rice. This method has numerous disadvantages in that the air itself will often contain a substantial amount of moisture and this is increased by the water formed from combustion of the fuel in the heating flame, so that in many cases the drying operation is relatively inefficient and often requires repeated recycling of the rice into contact with the stream of drying gases in order to attain the desired reduced moisture content in the rice. Also with this method it is often difficult to sufficiently closely control the temperature to which the rice is heated in the course of the drying operation, so that in many cases the rice will be heated to a temperature high enough to cause the rice to become brittle and to "check," with the result that, when the rice is subjected to the subsequent milling operations, the kernels will shatter and cause a substantial reduction in yield of the whole grains with consequent loss in value and quality of the product.

Accordingly, it is a principal object of this invention to provide a process for drying grains and particularly rice, by which many of the aforementioned disadvantages of existing methods may be obviated.

The process in accordance with this invention, briefly stated, comprises placing the moisture-containing grain, such as "paddy" rice, in intimate physical contact with a finely-divided, solid desiccant for a time sufficient to cause the desiccant to extract from the grain the requisite amount of moisture, and then separating the dried grain from the desiccant. Mild heating may be employed in the contacting step to assist in the moisture removal. The process in accordance with this invention is adapted either for batch, intermittent, or continuous operation. The latter will include such steps as continuously removing absorbed moisture from the desiccant and recirculating the dried desiccant into contact with additional quantities of fresh grain. Other steps may include supplying heat for the operation by heating the desiccant; simultaneously removing absorbed moisture from the desiccant while heating it to the temperature to be employed in the grain-contacting step; and other steps to be described hereinafter which provide a highly efficient grain drying process.

The desiccant or dehydrating agent employed in the process in accordance with this invention may be one of a large number of well known natural or synthetic materials having relatively high adsorptive or absorptive capacity for moisture. Such desiccants include fuller's earth and similar argillaceous earths including the bentonites; diatomaceous earths; and synthetic desiccants such as various silica, magnesia and alumina gels. The desiccant will preferably be in finely-divided or powdered form in order to provide a maximum amount of surface for the contact with the individual grain particles. The desiccant particle size ordinarily used will be such as will pass through standard screens of 100 or more meshes to the inch. In some cases particle sizes larger than 100 mesh may be used. Desiccants of the types mentioned will be preferred because they are relatively cheap and are chemically inert with respect to the grain and the moisture removed therefrom, and also because they are normally non-injurious to humans or animals in the event that small amounts may accidentally be allowed to remain with the grain through its final processing. These desiccants may ordinarily be used in their simple air-dried state in which they will generally be found to have sufficient moisture adsorptive capacity for the purposes of this process, but may be heated or even calcined, if necessary, to improve their adsorptivity. The contact of the grain with the desiccant may be effected at atmospheric temperatures, but it will be found preferable in many cases, particularly in continuous drying operations, to maintain the contacting step at slightly elevated temperatures, primarily for purposes of increasing the speed and efficiency of the drying operation. The temperatures employed will vary generally with the particular grain, its initial moisture content and the amount of reduction in moisture to be effected, the contact time employed, and the relative proportions of grain to desiccant employed in the process. In every case, the temperature employed will be below that at which excessive brittleness or "checking" of the grain kernels will develop, in order that a maximum yield of whole kernels will be obtained from further processing of the grain.

Where temperatures above atmospheric are employed, the necessary heat may be most conveniently supplied by heating the desiccant to an appropriate temperature and employing the heated desiccant as the heat-transfer agent for the contact step of the process. This will be found to be advantageous because the desiccants of the types mentioned will ordinarily be unaffected by heating, particularly to the relatively mild temperatures required. Localized overheating of the grain may be thus avoided and accurate control of the final processing temperature may be exercised. In accordance with one embodiment of this invention, the dehydrating step may be accomplished by simply thoroughly mixing the grain with the desiccant and allowing the mixture to stand for a period of time sufficient to effect the transfer of the requisite amount of moisture from grain to the desiccant, and thereafter separating the grain from the desiccant in any suitable or conventional manner.

In another embodiment, the grain and desiccant may be agitated together during the contact period to speed up the dehydrating action. In still another embodiment, the desiccant, after being separated from the grain, may be dried by heating in a current of air to remove absorbed moisture and then returned for treatment of additional quantities of fresh grain.

Accordingly, the present invention has for its principal object the provision of an improved process for drying grains.

An important object is the provision of the process for drying grains by intimate contact of the grain with a solid desiccant.

Another important object is the provision of a continuous process for drying grain by direct intimate contact with a solid desiccant, separating the desiccant from the grain after it has removed the requisite amount of moisture from the grain, removing the absorbed moisture from the desiccant, and returning the dried desiccant into contact with additional quantities of fresh grain.

A more specific object is the provision of an improved process for drying rice by intimate contact with a solid desiccant.

Other and more specific objects and advantages of this invention will become apparent from the following detailed description when read in conjunction with the accompanying drawings which include flow diagrams illustrative of the flow of materials in accordance with several useful embodiments of this invention.

In the drawings:

Fig. 1 is a simplified flow diagram illustrative of the basic process;

Fig. 2 is a more extensive flow diagram illustrative of a more complete embodiment of the process including recirculation of the desiccant, and showing in broken outlines additional supplementary steps useful in the process; and Fig. 3 is a perspective view of an assembly of apparatus illustrative of an arrangement which may be employed in conducting the process as outlined, particularly in Fig. 2.

Referring to Fig. 1, the flow diagram there shown illustrates the steps of the basic process which will be described, for purposes of illustration, in connection with the drying of rice.

"Paddy" rice containing about 20% of moisture will be introduced into a mixing zone 10 through a line indicated at 11. A suitable desiccant, such as finely ground fuller's earth, will be introduced into mixing zone 10 through a line indicated at 12, and the grain and desiccant will be thoroughly mixed in the mixing zone in any conventional manner, as by stirring with a paddle wheel or other conventional mixing device. One useful mixture will consist of about one part by volume of rice to two parts of the fuller's earth, although these proportions may be varied widely to meet particular conditions. The mixture of rice and fuller's earth will then be transferred to a suitable contacting zone 13, such as a tank, or bin, where the mixture will be allowed to remain for a time sufficient to effect the transfer of the requisite quantity of moisture from the rice to the fuller's earth. In the contacting zone the mixture may be allowed to remain quiescent for the necessary period of time or the mixture may be thoroughly agitated during the contact period if desired, or it may be transferred from one bin to another in contact with the agent by means of conveyor belts or elevator belts or other conventional means. The latter will normally speed up the drying operation. At the conclusion of the contact period the mixture will be transferred to a separating zone 14 where the dried rice will be separated from the fuller's earth, by means of any conventional and suitable separating device.

The contacting step may be conducted at atmospheric temperatures, since fuller's earth and similar desiccants in their normal air-dried state will ordinarily have sufficient adsorptive capacity to remove the required amount of moisture from the grain; however, the contact time may be substantially reduced by conducting the contacting step at slightly elevated temperatures. In the case of rice, this temperature will normally be between atmospheric and 140 degrees F., which is about the maximum temperature to which the rice may be heated without danger of causing excessive brittleness or "checking." The temperatures used will vary, of course, for other grains. The elevated temperatures may be obtained by heating the fuller's earth in any suitable manner, as by passing it through a conventional type of heater, indicated at 15, prior to mixing it with the rice.

Fig. 2 illustrates a continuous process for drying rice in which recirculation of the fuller's earth is employed as well as other supplementary steps for increasing the efficiency of the process.

In this case, the rice and the fuller's earth are conducted through the same steps as in the basic process previously described, the dried rice being withdrawn from the separating zone through a line 16 and sent to storage or to subsequent milling operations. The fuller's earth is withdrawn from separating zone 14 through a line 16a and transferred to a drier 17 in which the fuller's earth will be heated by a suitable heating medium in the presence of a current of air in order to remove absorbed moisture from the fuller's earth and to heat the earth to a temperature desired for the rice-contacting step.

Heating of the fuller's earth may be effected in drier 17 in any conventional manner, as by moving the fuller's earth in thin layers on conventional belt conveyors over closed heating coils, indicated at 18, through which a suitable heating medium, such as steam, hot water or the like, may be circulated through lines 19 and 20. A slow moving current of air introduced into one end of drier 17 through a line 21 and exhausted therefrom through a line 22 at the opposite end, will be caused to pass over the surface of the bed of fuller's earth as it is heated in order to extract therefrom the adsorbed moisture. The thus dried and heated fuller's earth will then be removed from drier 17 through a line 23 and returned into line 12 where it will re-enter the mixing zone for contact with additional quantities of fresh rice. This cyclic flow of fuller's earth will be maintained throughout the rice drying operation. Any losses of the fuller's earth in the process may be continuously made up by introducing make-up quantities of the fuller's earth either through line 12 or through a line 24 connected into line 16 in advance of drier 17. For control purposes and greater efficiency, a portion of the fuller's earth leaving separating zone 14 may be by-passed around drier 17 through a line 25 and introduced directly into line 23 in advance of its entrance of line 12. Line 25 will be provided with a valve 26 by which the relative proportions of the fuller's earth passing through line 25 and drier 17 may be regulated, in order to more accurately control the temperature and moisture content of the fuller's earth entering mixing zone 10.

For greater efficiency and reduction of losses in the process, various additional steps may be employed. For example, the dried rice leaving separating zone 14 through pipe 16 may be passed through a cleaning chamber or zone 27 in which the rice may be scrubbed with a stream of air introduced through a line 28 in order to remove any particles of the fuller's earth which might cling to the rice grains leaving the separating zone. The stream of air leaving scrubber 27 and carrying the fine fuller's earth particles will then be passed through line 29 into a conventional form of dust collector 30. In the latter the fuller's earth will be separated from the air and returned through a line 31 into line 16 where it will rejoin the main body of fuller's earth. The air entering drier 17 for purposes of drying the fuller's earth may be passed through a conventional form of dehumidifier 32 in order to control the moisture content of the air employed in the drying of the fuller's earth. Similarly the air leaving drier 17 through line 22 may be passed through a conventional dust collector 33 to knock out any fuller's earth which may be carried out with the exhaust air from the drier, and to return the recovered fuller's earth into line 23, thus further reducing losses of fuller's earth in the process.

Fig. 3 illustrates one specific arrangement of apparatus elements corresponding to the principal elements indicated in the flow diagrams for conducting a continuous rice drying operation. The principal elements of this apparatus arrangement are numbered to correspond with the numbering of the equivalent elements of the flow diagrams and the details thereof will be described hereinafter for purposes of additional explanation of the new process.

Moist grain enters the process through the duct 11 and enters a horizontally disposed, cylindrical mixing chamber 10, adjacent one end thereof. The desiccant, such as fuller's earth, enters mixing chamber 10 adjacent its opposite end through the duct 12. Mixing chamber 10 forms a housing for a rotatable metering gate 30a mounted on a shaft 31a which is journalled at 32a in the opposite ends of the mixing chamber. Metering gate 30a is of generally cylindrical form and is provided with a plurality of axially extending pockets 33a, divided intermediate their ends by a transverse partition member 34 which is adapted to be adjusted axially of the mixing gate to vary the relative volumetric capacities of the portions of pockets 33a on opposite sides of the partition. Duct 11 is arranged to discharge rice into the pockets on one side of partition member 34, while duct 12 discharges desiccant into the opposite group of pockets, as the metering gate is revolved. By suitable adjustment of the dimensions of the pockets, the relative proportions of rice to desiccant entering mixing chamber 10 may be regulated as desired. It will be understood that gate 30a may be revolved at any desired speed by connecting any conventional type of power means (not shown) to shaft 31a. Rotation of gate 30a will dump the rice and fuller's earth together, through a hopper 35 into one end of an elongated tubular housing 36 which constitutes the dehydrating zone 13. Rotatably mounted in housing 36 is a conventional screw conveyor 37 which is adapted to pick up the mixture of rice and fuller's earth entering one end of housing 36 and move the mixture toward the opposite end of the housing. The close contact of the fuller's earth with the rice will be maintained throughout their passage through housing 36 by the constant agitation effected by rotation of conveyor 37. The speed, length and volume of the conveyor will be such as to provide the proper contact time for the rice and fuller's earth to effect the requisite degree of drying. The opposite end of housing 36 is provided with a screened opening 38 in its lower side, which constitutes the separating zone 14 of the process. The mesh of the screen will be such as to pass the particles of fuller's earth and retain the rice grains. As the screw conveyor moves the mixture over screened opening 38, the fuller's earth will fall through the screen into a collecting chamber 39 for disposal as will be hereinafter described. The rice will continue to be moved by conveyor 37 over screened section 38 into cleaning zone 29 which has screened openings 40 and 41 in the upper and lower sides, respectively, of housing 36, the screen being of a mesh size to retain the rice grains while passing the fuller's earth. These screened openings are enclosed by a casing 42 having the inlet 28 for a relatively high velocity stream of air and the outlet 29 for exhaust of the air. The air entering casing 42 will blow through screened opening 41 and through the rice passing over this opening and will dislodge any particles of fuller's earth which may have remained on the rice grains passing the separating screen 38 and blow them out of housing 36 through screened opening 40, whence the exhaust air carrying the dislodged fuller's earth particles will discharge through outlet 29 to a dust collector or separator as previously described. The dried rice, thoroughly cleaned of fuller's earth, will be discharged from the end of housing 36 through the duct 16 to storage or for further handling as desired.

The main body of the fuller's earth deposited in collecting chamber 39 will be picked up by the lower end of a vertically disposed screw conveyor 43, corresponding to line 16a of the flow diagram, and discharged from the upper end thereof through a spreader type hopper 44 into drying chamber 17. A wide endless belt 45 is disposed in chamber 17 to receive on one end of its upper surface a thin bed of fuller's earth which will be deposited thereon from hopper 44. Heating coils 18 of any conventional form, are disposed beneath belt 45 to heat the latter and the supported layer of fuller's earth to a desired temperature, the heat being supplied by circulating any suitable and conventional heating medium such as hot water, steam, etc. through coils 18. A low velocity stream of air will be introduced into chamber 17 near the outlet end thereof through duct 21 and will flow over the surface of the moving bed of fuller's earth, generally countercurrent to its direction of movement and will be exhausted from chamber 17 through an exhaust stack 22. The air entering duct 21 may be dehumidified, as previously noted, but this is not essential. In any event the combination of the current of air and heat applied to the fuller's earth will remove adsorbed moisture therefrom, while the fuller's earth, which may be thus simultaneously heated to the desired rice drying temperature, will discharge off of the end of belt 45 into a hopper corresponding to line 23 of Fig. 2, whence it is returned through duct 12 to the mixing zone for treatment of fresh quantities of grain. It will be understood that exhaust stack 22 may lead to a dust collector, as previously described, for the recovery of any fuller's earth which may be carried out of the system by the drying air. Various parts of the apparatus may be suitably heat-insulated to conserve heat.

As previously noted the time of contact for the grain and desiccant is variable. In drying rice with fuller's earth by the continuous method above described 3 to 5 minutes at a temperature of from 110 to 140° F. will generally be adequate for most conditions. Other grains and other desiccants may employ other contact times and temperatures as may be found desirable.

While the continuous process heretofore described will be found more generally useful, particularly at central storage elevators or mills, the process may be successfully practiced by batch or intermittent operations. For example, individual farmers who may wish to store grain, may do so safely by mixing the grain with the desiccant and depositing the mixture in suitable storage bins. Such mixtures may be safely stored for long periods of time, as the desiccant will extract the moisture from the grain and the latter will then be protected against fermentation or molding. During the storage period the mixture of grain and desiccant may be transferred from one storage bin to another at intervals to agitate the mixture. Then, whenever the farmer desires to dispose of the grain, the mixture may be passed through a suitable screen separator to separate the grain from the desiccant. In this case, the long time of contact will be a substitute for the elevated temperatures and shorter contact time normally employed in the continuous process described.

It will be understood that various changes may be made in the detailed steps of the process embodiments described and that many forms of conventional apparatus may be used for practicing the process without departing from the scope of the appended claims.

What we claim and desire to secure by Letters Patent is:

1. The process for drying "paddy" rice which comprises, maintaining moisture - containing "paddy" rice in intimate contact with a finely-divided moisture-adsorptive clay material at a temperature below about 140° F. and for a time sufficient to effect the desired degree of dehydration of the rice, and separating the dried rice from the clay material.

2. The process for drying "paddy" rice which comprises, maintaining moisture - containing "paddy" rice in intimate contact with a finely-divided moisture-adsorptive clay material at a temperature below about 140° F. and for a time sufficient to effect the desired degree of dehydration of the rice, separating the dried rice from the clay material, removing absorbed moisture from the clay material, and returning the dried clay material into contact with additional quantities of moisture-containing "paddy" rice.

LEONIDAS N. LYON, Jr.
BENJAMIN F. ARNIM.

REFERENCES CITED

The following references are of record in the file of this patent:

UNITED STATES PATENTS

| Number | Name | Date |
|---|---|---|
| 613,267 | Gruene | Nov. 1, 1898 |
| 916,448 | Jessup | Mar. 30, 1909 |
| 1,117,720 | Stone | Nov. 17, 1914 |
| 1,247,284 | Kruger | Nov. 20, 1917 |

FOREIGN PATENTS

| Number | Country | Date |
|---|---|---|
| 337,899 | Great Britain | Nov. 13, 1930 |